Figure 1:
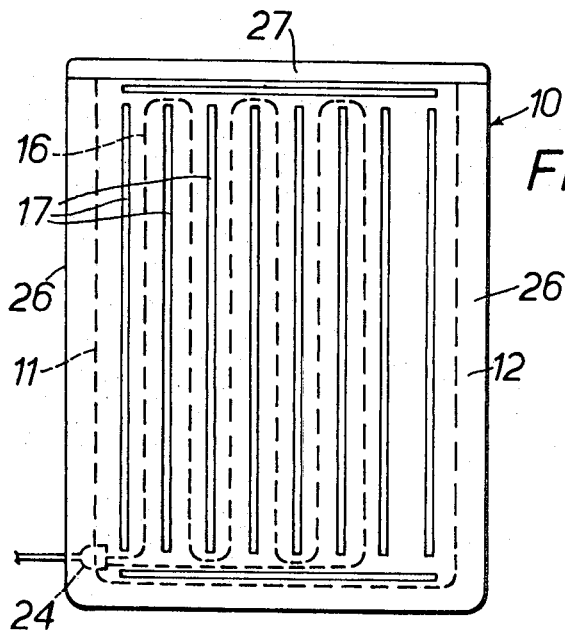

United States Patent

[11] 3,548,147

| | | |
|---|---|---|
| [72] | Inventor | Leonard C. Owers<br>Southampton, England |
| [21] | Appl. No. | 764,768 |
| [22] | Filed | Oct. 3, 1968 |
| [45] | Patented | Dec. 15, 1970 |
| [73] | Assignee | Dreamland Electrical Appliances Limited<br>Southampton, England |
| [32] | Priority | Nov. 1, 1967 |
| [33] | | Great Britain |
| [31] | | No. 49725/67 |

[54] LAMINATES AND ELECTRICALLY HEATED BLANKETS INCORPORATING SUCH LAMINATES
9 Claims, 7 Drawing Figs.

[52] U.S. Cl. ...................................... 219/212,
219/528, 219/549
[51] Int. Cl. ...................................... H05b 3/34,
H05b 3/54
[50] Field of Search ...................................... 219/212,
528, 529, 549, 527, 535; 29/611—613; 156/229

[56] References Cited
UNITED STATES PATENTS

| 3,102,186 | 8/1963 | Owers | 219/212 |
| 3,213,521 | 10/1965 | Owers | 219/212X |
| 3,419,702 | 12/1968 | Piel | 219/527X |

*Primary Examiner*—Joseph V. Truhe
*Assistant Examiner*—Peter W. Gowdey
*Attorney*—Stevens, Davis, Miller and Mosher ABSTRACT: This invention relates to a laminate which comprises two layers of nonwoven fabric made from textile fibres, each layer of the laminate having on that face which is in contact with the other layer a quantity of weldable fibres which constitute at least 50 percent of the total weight of fibres in said face, the two layers being welded together in a predetermined pattern, the invention also including an electrically heated blanket formed of such a laminate and the method of manufacturing the blanket.

INVENTOR
LEONARD C. OWERS

LAMINATES AND ELECTRICALLY HEATED BLANKETS INCORPORATING SUCH LAMINATES

This invention concerns improvements in or relating to laminates and in particular to laminates for use in the manufacture of electrically heated blankets or pads.

According to the present invention there is provided a laminate comprising two layers on nonwoven fabric made from textile fibres, each layer having on that face which is in contact with the other layer a quantity of weldable fibres which constitute at least 50 percent of the total weight of fibres in said face, said two layers being welded together in a predetermined pattern.

Each fabric layer may comprise a scrim fabric having on one side a web of textile fibres needle punched thereto and on the other side a web of weldable fibres needle punched thereto.

The invention also includes an electrically heated blanket or pad comprising a laminate according to the present invention having an electric heating element disposed between the two layers of nonwoven fabric, the two layers being welded together in spaced apart substantially parallel runs to form channels in which the runs of the heating element are received.

Preferably a method of manufacturing an electrically heated blanket or pad comprises the steps of laying on a jig or bed a layer of the laminate with the face including said weldable fibres uppermost, laying on said face the electric heating element, laying on said electric heating element the other layer of the laminate with the face including said weldable fibres lowermost and then welding the two layers together in spaced apart substantially parallel runs.

Objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of only some of the various ways in which the principle of the invention may be employed.

Figure 3:
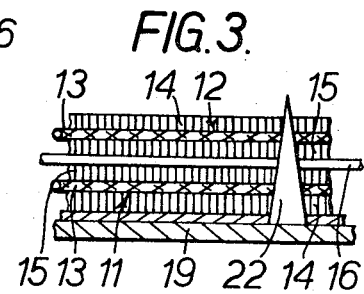
Figure 2:
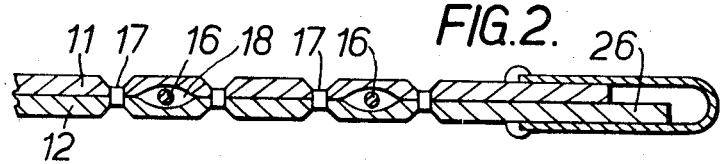
Figure 4:
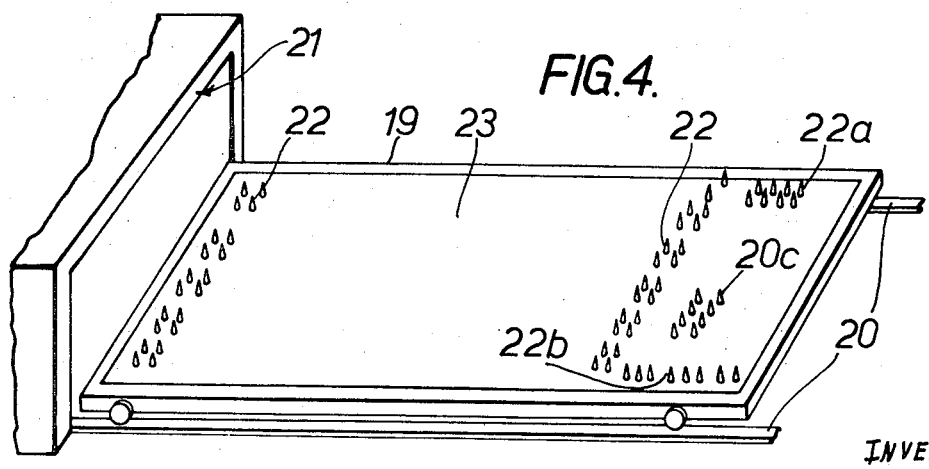
Figure 5:
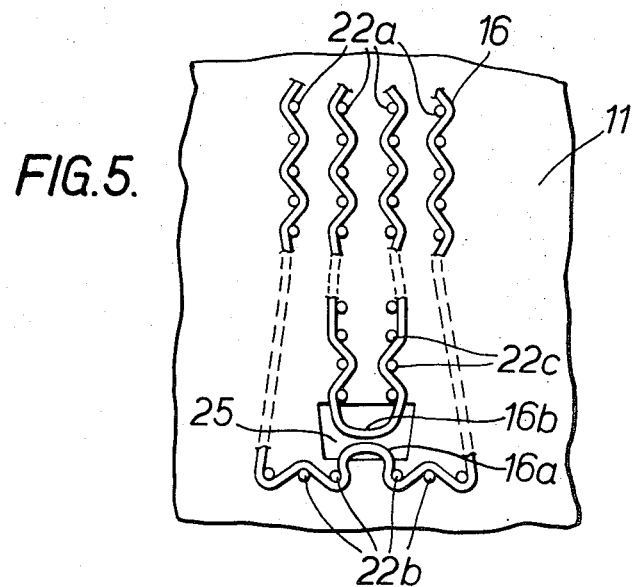
Figure 6:
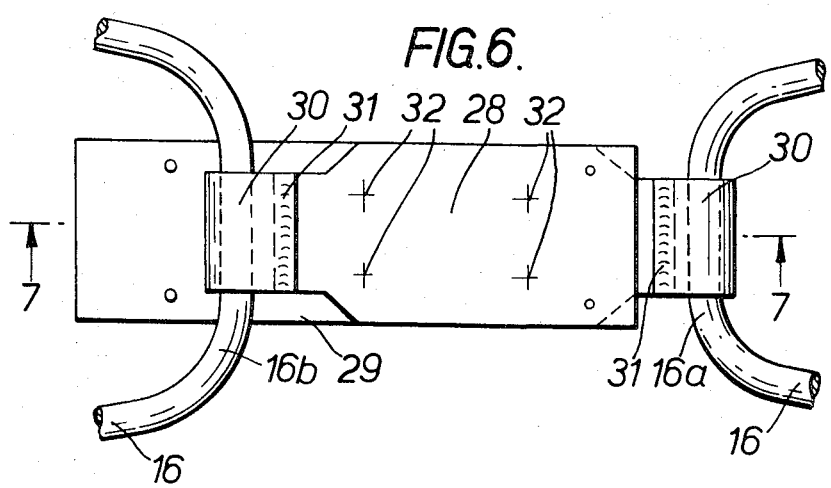
Figure 7:
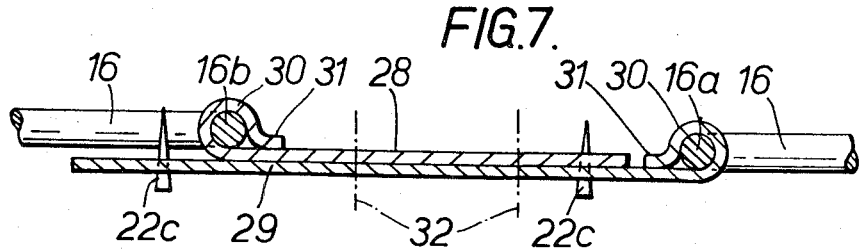

In said annexed drawings:

FIG. 1 is a plan view of an electrically heated blanket which includes a laminate according to the present invention, FIG. 2 is a section through part of the blanket on a larger scale, FIG. 3 is a much enlarged section through the two layers of the laminate, FIG. 4 is a perspective view of a jig on which the layers of the laminate and the electrical heating wire are laid prior to welding, FIG. 5 is a plan view of one method of tensioning the electrical heating wire whilst laid on the jig, FIG. 6 is a plan view of an alternative method of tensioning the electrical heating wire, and FIG. 7 is a section taken along the line 7-7 indicated on FIG. 6.

The electrically heated blanket 10 comprises a laminate formed by two layers 11 and 12 of nonwoven fabric made from textile fibres. The layers 11 and 12 each comprise a cotton scrim fabric 13 on one face of which is a web of rayon fibres 14 which are locked to the scrim fabric 13 by a needle punching process and on the opposite side is a web of polyvinyl chloride fibres 15 which are also locked to the scrim fabric 13 by a needle punching process.

The layers 11 and 12 are laid one on top of the other with the faces containing the polyvinyl chloride fibres 15 in contact with each other. If the two layers 11 and 12 are subjected to a high frequency electric current the polyvinyl chloride fibres 15 become homogenous and effectively seal the two layers 11 and 12 together.

Through carrying out welding tests we have ascertained that in order to obtain a satisfactory fusion weld of the required penetration and strength the quantity of polyvinyl chloride fibres 15 in each layer 11 and 12 must constitute at least 50 percent of the total weight of fibres in the respective face. Below this quantity of polyvinyl chloride fibres 15 the resultant weld was round to be imperfect.

In this particular embodiment the layer 11 comprises a cotton scrim fabric 13 having 2 ounces of cotton per square yard. The rayon fibres 14 comprise 3 ounces per square yard and the polyvinyl chloride fibres 15 constitute 100 percent of the fibres on the other face and comprise 2 to 3 ounces per square yard.

The layer 12 comprises a cotton scrim fabric 13 having 2 ounces of cotton per square yard. The rayon fibres 14 comprise 3 ounces per square yard and the fibres on the opposite side of the scrim fabric comprise 1½ ounces per square yard of polyvinyl chloride fibres and 1½ ounces per square yard of rayon fibres, the two types of fibres being evenly intermixed.

The blanket 10 also includes an electric heating wire 16 disposed between the two layers 11 and 12 of the laminate. The layers 11 and 12 are welded together in spaced apart runs 17 so as to leave channels 18 in which the runs of the wire 16 are disposed. The runs 17 of welding may simulate quilting to give a pleasant external appearance to the finished blanket 10. One edge of the blanket 10 is provided with a binding of satin or similar ribbon material 27 which is stitched to the layers 11 and 12.

The electric blanket 10 may be manufactured by the following method.

The layer 11 is placed on a jig plate which comprises a tray 19 formed from aluminum and which is movable along a track 20 towards a welding apparatus 21. The tray 19 is provided on two opposite sides with two adjacent rows of upstanding pointed pins 22, the pins 22 in one row being staggered relatively to the pins 22 in the adjacent row. The tray 19 is covered with an insulating material such as varnished cambric 12 over which is laid a sheet 23 of rayon 13 or similar material to form a datum for the disposition of the layers 11 and 12 of the laminate. The sheet 23 of rayon 13 is cut so as to form a datum edge in relation to the pointed pins 22 on one edge of the tray 19.

The layer 11 is placed on the tray 19 with the face containing the polyvinyl chloride fibres 15 uppermost. The layer 11 is aligned with the datum edge of the sheet 23 and any lengthwise excess material is equally spaced about the two outer pins on each side and the layer 11 is pressed over all the pins 22 which protrude through the layer 11 and retain it on the tray 19.

A moulded plastic connector 24 of flat rectangular shape, into which are affixed by fusion moulding the electric conducting wires 16 which form the heating element, is placed in position on the edge of the layer 11. The connector 24 is located in position by some of the pins 22 which contact the edges of the connector. The wires 16 are then wound around the pins 22 so as to extend from one end of the tray 19 to the other end thereof. The runs of the wires are disposed in substantially parallel lines which are spaced apart at distances determined by the disposition of the pins 22.

The wires 16 are liable to be stretched during their positioning on the layer 11 and in order to take up any stretching of the wires a tensioning device is provided which is shown more clearly in FIG. 5. The wire 16 is first wound around a series of closely pitched pins 22a to form runs of wire 16. Each run is laid in zigzag form around the pins 22a. Two of the runs extend to and are laid around a row of pins 22b and form a loop 16a. The other two runs extend to and are laid around rows of pins 22c to form a second loop 16b. The two loops 16a, 16b are pulled towards each other and held in position on the layer 11 by a strip of adhesive material 25.

Over this assembly is laid the layer 12, which is of larger dimensions than the layer 11, with the face containing the polyvinyl chloride fibres 15 lowermost and with one edge aligned with the datum edge determined by the sheet 23. The layer 12 is wider and longer than the layer 11 so as to provide three side edges 26 of "tuck-in" material on the finished blanket which in use on the bed enable the bottom and side edges to be tucked under a mattress or the like of the bed. These side edges 26 are folded inwardly but do not extend as far as the welding area. The layer 12 is pressed downwardly so that the pointed pins 22 protrude therethrough to hold the layer 12 in correct relationship with the layer 11.

When the assembly has thus been completed the tray 19 is passed into the welding apparatus 21 where the two layers 11 and 12 are subjected to high frequency electronic welding along a plurality of substantially parallel lines 17. The lines of welding may comprise a series of spot welds or they may be continuous lines to form a quilting effect.

The welding produces fusion of the two faces containing polyvinyl chloride fibres 15 along the lines 17 of welding and secures the two layers 11, 12 together with the runs of the wire 16 therebetween.

When the welding operation is completed the tray 19 is withdrawn from the welding apparatus 21 and the blanket is removed from the tray 19. The blanket now consists of the two layers 11 and 12 welded together with the outer rows of welds within the periphery of the sheet 23. Three side edges of the layer 11 are not trimmed and finished with an overlock stitch, which is stitched again through the overlock stitching to the larger layer 12 thus finishing and securing three edges of the layer 11.

The moulded plastic connector 24 is then single stitched to and through the two layers 11 and 12 in order to secure the connector thereto.

The tuck-in side edges 26 of the layer 12 are then trimmed to a predetermined width from the finished edge of the layer 11 and finished with an overlock stitching.

The remaining edge of the layer 12 and the layer 11 which have previously been referred to as the datum edge are then trimmed to the correct width and finished with a sewn binding of satin or similar ribbon material 27.

FIG. 6 and 7 illustrate an alternative method of tensioning the wire 16. In this alternative arrangement two tensioning strips 28 and 29 are slid onto the wire 16 so as to lie at predetermined points corresponding to where the loops 16a and 16b are to be formed. Each tensioning strip 28, 29 is formed from a sheet or strip of polyvinyl chloride which is preferably 0.012 inches thick and cut to a suitable length. At one end 30 of each strip 28, 29 the material is tapered to a width sufficient to take the loops 16a or 16b. The end 30 is bent over and welded at 31 to form a passage through which the heating wire 16 can pass easily therethrough.

After the wire 16 has been wound around the pins 22, 22a and 22b the loop 16b is located in the passage of the tensioning strip 28 and the loop 16a is located in the passage of the tensioning strip 29. The tensioning strip 29 is pulled to tension the wire 16 and is pressed over the nearest set of pins 22c to be held in position. The tensioning strip 28 is then pulled in a direction opposite to the direction of pull applied to the tension strip 29 and partly covers the strip 29. It is then pressed over the nearest pins 22c to hold it in position.

The overlapping portions of the tensioning strips 28, 29 between the loops 16a and 16b are welded together at 32 and to the inner surfaces of the layers 11 and 12 when subjected to high frequency electric current in the welding apparatus 21.

Preferably the blanket 10 is an electrically heated overblanket.

Other modes of applying the principles of the invention may be employed, change being made as regards the details described, provided the features stated in any of the following claims or the equivalent of such be employed.

I claim:

1. An electrically heated blanket comprising two prelaminated layers of nonwoven fabric made from textile fibres, each fabric layer comprising a scrim fabric having, on one side, a web of textile fibres needle punched thereto and, on the other side, a web of weldable fibres needle punched thereto, the layers being placed one on top of the other with the upper face of the bottom layer in contact with the lower face of the upper layer, an electric element disposed in runs between the two layers of fabric, each layer having on that face which is in contact with the other layer a quantity of weldable fibres which constitute at least 50 percent of the total weight of fibers in said face, the two layers being welded together in spaced apart substantially parallel runs to form channels in which the runs of the heating element are received.

2. An electrically heated blanket as claimed in claim 1 in which the runs of the electric heating element are held in tension, the element being sent to form two opposed loops which after being pulled towards one another to tension the runs are secured to one of said layers by a strip of adhesive material.

3. An electrically heated blanket as claimed in claim 1 in which the runs of the electric heating element are held in tension, the element being bent to form two opposed loops, a tensioning strip for each loop, a passage formed in each strip for receiving the associated loop, the tensioning strips after being pulled towards one another in order to tension said runs being secured together and to the layers of nonwoven fabric.

4. A laminate as claimed in claim 1, in which the weldable fibres comprise not less than 1 ounce per square yard.

5. A laminate as claimed in claim 1, in which the weldable fibres comprise 2 to 3 ounces per square yard.

6. A laminate as claimed in claim 1, in which the weldable fibres are polyvinyl-chloride fibres.

7. A laminate as claimed in claim 1, in which the textile fibres comprise rayon fibres.

8. The blanket of claim 1 wherein one of said layers has on that pace which is in contact with the other layer a quantity of weldable fibres which constitute 100 percent of the total weight of fibres of said face.

9. A laminate as claimed in claim 1, in which each fabric layer comprises a scrim fabric formed from cotton, the weight of cotton of said scrim fabric comprising 2 ounces per square yard, said scrim fabric having on one wide a web of textile fibres needle punched thereto and on the other side a web of weldable fibers needle punched thereto.